United States Patent [19]

Nguyen et al.

[11] Patent Number: 4,972,363
[45] Date of Patent: Nov. 20, 1990

[54] NEURAL NETWORK USING STOCHASTIC PROCESSING

[75] Inventors: Dziem D. Nguyen, Redmond; Fredrick B. Holt, Seattle, both of Wash.

[73] Assignee: The Boeing Company, Seattle, Wash.

[21] Appl. No.: 305,962

[22] Filed: Feb. 1, 1989

[51] Int. Cl.$^5$ .................. H03K 19/08; H03K 19/12; G06G 7/00
[52] U.S. Cl. .................. 364/807; 307/201; 364/148; 364/513
[58] Field of Search ............ 364/148, 807, 513, 713, 364/602; 365/215, 125; 307/201

[56] References Cited

U.S. PATENT DOCUMENTS

| | | | |
|---|---|---|---|
| 3,579,191 | 5/1971 | Andreae et al. | 364/200 |
| 4,494,233 | 1/1985 | Bahr et al. | 370/86 |
| 4,521,882 | 6/1985 | Gabrielli et al. | 370/85 |
| 4,564,838 | 1/1986 | Boulogne et al. | 340/825.5 |
| 4,623,886 | 11/1986 | Livingston | 340/825.5 |
| 4,667,192 | 5/1987 | Schmid et al. | 340/825.5 |
| 4,809,193 | 2/1989 | Jourjine | 364/513 |
| 4,821,222 | 4/1989 | Arrathoon | 364/713 |
| 4,858,147 | 8/1989 | Conwell | 364/513 |

OTHER PUBLICATIONS

Nguyen, D. and Holt, F., "Stochastic Processing in a Neural Network Application", *IEEE First International Conference on Neural Networks*, vol. III, pp. 281–291, (Jun. 1987).

Gupta, P. and Kumaresan R., "Stochastic and Deterministic Computing-Digital Filtering and Other Applications", Paper Presented at International Conference on Signals, Systems and Computers, Nov. 10–12, Asilomar, Calif., (1986).

Van den Bout, D. and Miller T., "A Stochastic Architecture for Neural Nets", *Proc. of ICNN '88*, vol. I, pp. 481–488.

*Primary Examiner*—Jerry Smith
*Assistant Examiner*—Jim Trammell
*Attorney, Agent, or Firm*—Christensen, O'Connor, Johnson & Kindness

[57] ABSTRACT

An apparatus and method for implementing a neural network having N nodes coupled to one another by interconnections having interconnect weights $T_{ij}$ that quantify the influence of node j on node i. The apparatus comprises a node circuit for each node and a data processor. The data processor receives one or more library members, and transmits the interconnect weights to the node circuits. The data processor also stores a current state vector, and receives input data representing a library member to be retrieved. The data processor then performs an iteration in which the current state vector is sent to the node circuits, and an updated state vector is received from the node circuits, the iteration being commenced by setting the current state vector equal to the input data. Each node circuit comprises one or more stochastic processors for multiplying the state vector elements by the corresponding interconnect weights, to determine the updated state vector. Each stochastic processor preferably includes means for generating a pseudorandom sequence of numbers, and using such sequence to encode the interconnect weights and state vector elements into stochastic input signals that are then multiplied by a stochastic multiplier comprising delay means and an AND gate.

13 Claims, 7 Drawing Sheets

NEURAL NETWORK USING STOCHASTIC PROCESSING

FIELD OF THE INVENTION

The present invention relates to data processing and, in particular, to an apparatus and method for implementing a neural network operable as an associative memory.

BACKGROUND OF THE INVENTION

A neural network is one example of a parallel, distributed, data processing system. A neural network contains a large number of processing elements or nodes of simple processing capability, the number of nodes being the size of the network. The nodes are connected with each other to form a fully connected, or nearly fully connected network. The network performs parallel data processing based on a constraint satisfaction paradigm that has been shown to lead to collective computation capabilities.

The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network. The matrix-vector multiplication is often followed by some nonlinear function, such as clipping or clamping.

One of the many applications of a neural network is as an associative memory system. In this particular application, once a set of patterns, termed "library elements", has been stored in the network, the user can recall a desired pattern or library element by providing the network with incomplete or noisy information on the pattern in question. For example, if the library elements comprise a set of two-dimensional images, one can input a portion of one image to the neural network, and the neural network will produce the entire image. An associative memory based on a neural network is robust and fault tolerant. However, the neural network requires a separate processor for each node. In the large systems required for practical applications, this can lead to considerable difficulties in implementing the network.

SUMMARY OF THE INVENTION

The present invention provides an apparatus and method for implementing a neural network using stochastic processing techniques, to thereby provide the hardware efficiency for implementing large networks.

The network to be modeled is assumed to have N nodes coupled to one another by interconnections having interconnect weights $T_{ij}$ that quantify the influence of node j on node i. The apparatus comprises a plurality of node circuits, one for each node, and data processing means. The data processing means includes means for receiving library data representing one or more library members, and means for using the library data to determine the interconnect weights $T_{ij}$. The interconnect weights are then transmitted to each node circuit. The data processing means also includes means for storing current state vector data representing a current state vector comprising N state vector elements.

The data processing means receives input data representing a library member to be retrieved. Most commonly, the input data will consist of a noisy or incomplete version of the library member. The data processing means includes means for performing one or more iteratons until the current state vector reaches an equilibrium value. Each iteration comprises transmitting the current state vector data to the node circuits, receiving updated state vector data representing an updated state vector from the node circuits, and setting the current state vector data equal to the updated state vector. The iteration is initialized by setting the current state vector data equal to the input data.

Each node circuit comprises one or more, and preferably N, stochastic processors. Each stochastic processor includes means for multiplying data representing one interconnect weight by data representing a corresponding state vector element, to produce a product signal. Means are provided for summing the product signals, to thereby determine the updated state vector data, and for transmitting the updated state vector data to the data processing means.

In a preferred embodiment, each stochastic processor includes means for generating a pseudorandom sequence of numbers, and means for using said pseudorandom sequence to encode data representing one interconnect weight and data representing one state vector element into first and second stochastic input signals. A stochastic multiplier then multiplies the input signals to produce a stochastic output signal representing the product of the interconnect weight and the state vector element. A preferred stochastic multiplier comprises delay means for one of the input signals, and an AND gate.

DETAILED DESCRIPTION OF A PREFERRED EMBODIMENT

Figure 1:
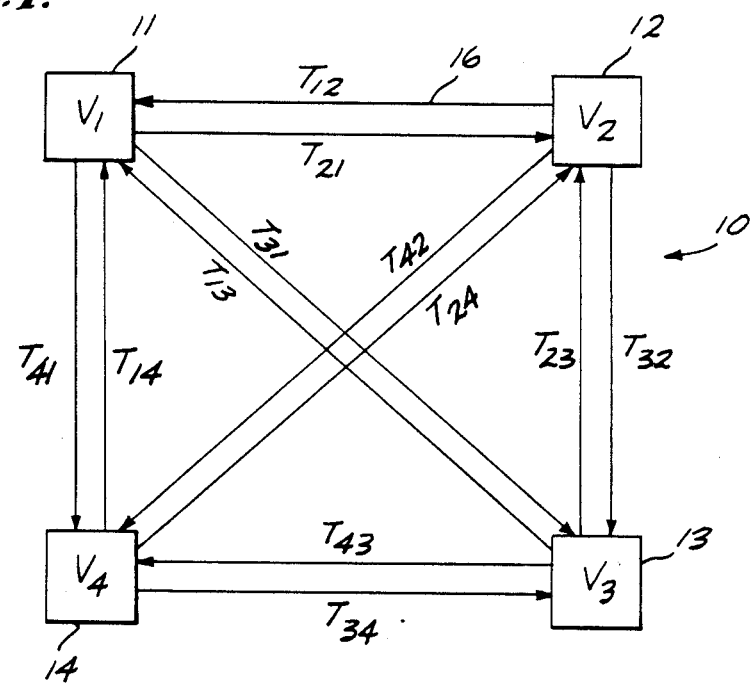
FIG. 1 is a schematic view of a generalized neural network.

FIG. 1 presents a schematic view of an example of a generalized neural network. The neural network 10 comprises four nodes or processors 11–14. Each node is connected to all other nodes by interconnection 16. The state or value of each node is designated $V_i$, where the index i identifies the node, i.e., i=1 through 4 in the example of FIG. 1. In general, each state vector element $V_i$ can be a binary, multilevel, or continuous value, and can be unipolar, with the value of the element varying between 0 and 1, or bipolar, with the value of the element varying between −1 and +1. The set of $V_i$ elements for all nodes in the network will be described as a "state vector" V of length N, where N is the network size, i.e., the number of nodes.

Associated with each interconnection 16 is an interconnect weight or transmittance value, $T_{ij}$, that quantifies the influence of an originator node j on a destination node i. These interconnect weights are calculated and changed, such as by a host computer, every time that a new library member is stored in the neural network. The technique for calculating the interconnect weights from the library members is described below. The matrix of interconnect weights will be referred to as the T matrix. The formulation of the T matrix makes the library members correspond to minimum energy states for the network.

The operation of a neural network as an associative memory can be summarized as follows. To store a new item of data, i.e., a new library member, the library member is first converted into a corresponding state vector. A host computer uses an appropriate formula (described below) to re-compute the interconnect matrix T, based upon the library members, including the new library member. To recall one of the stored library members, a partial or noisy version of a recall library member may be used as a key to initiate a search, by forcing some nodes to have particular state values corresponding to the known elements of the recall library member. After a few iterations, the neural network settles to a stable equilibrium state in which the state vector V corresponds to the library member closest to the recall library member. The equilibrium state will be close to the minimum energy state corresponding to the recall library member.

To produce a model of the neural network, it may be noted that each node, for example node i, receives an input signal from node j via one of interconnections 16 equal to $T_{ij}V_j$, i.e., the input signal from node j is equal to the state of node j ($V_j$) times the transmittance between nodes j and i ($T_{ij}$). Thus, the total input received by node i can be written as:

$$\sum_{j=1}^{N} T_{ij} V_j \quad (1)$$

where N is the total number of nodes in the neural network. Each node, either continuously or periodically, updates its state value $V_i$ by summing its inputs as per Equation (1), and then (optionally) operating on the total input value by a nonlinear node operator $C_i$ to determine a new state value. If the update operation occurs periodically at times m$\Delta$T, where $\Delta$T is the time period between updates, then each node performs the iteration:

$$V_i(m+1) = C_i \sum_{j=1}^{N} T_{ij} V(m)_j \quad (2)$$

Equation (2) can be generalized to:

$$V(m+1) = CTV(m) \quad (3)$$

where V(m+1) and V(m) are the state vectors at time indices m+1 and m, respectively, C is a vector denoting the node operator, and T is an N-by-N matrix of interconnect weights $T_{ij}$.

Figure 2:
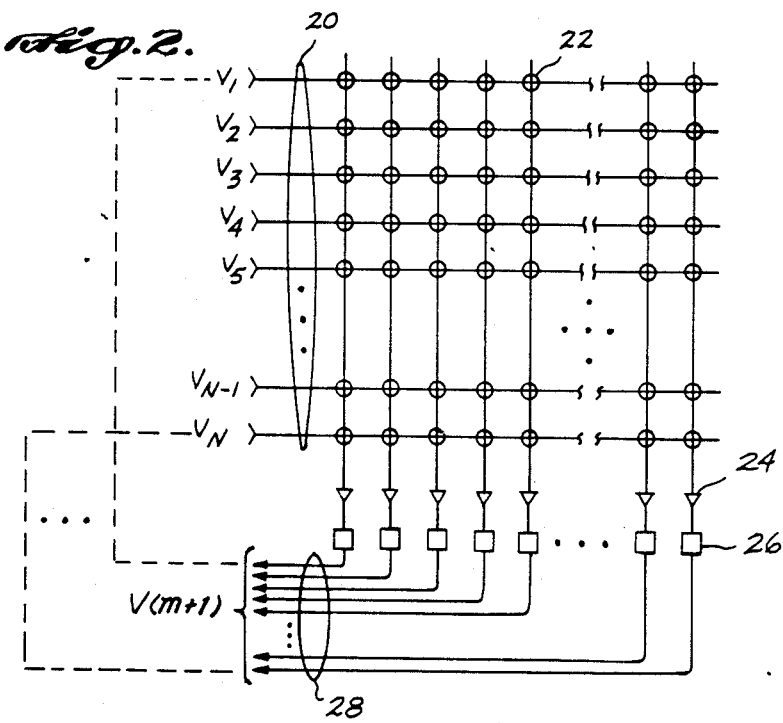
FIG. 2 is a schematic view showing the update algorithm.

FIG. 2 presents a schematic view of the update algorithm. The signals on lines 20 represent the present value of the state vector V. Circles 22 symbolize the interconnect matrix elements $T_{ij}$, summation is indicated by symbols 24, and the nonlinear function C is symbolized by blocks 26. The updated state vector V(m+1) is produced on lines 28, in accordance with Equations (2) and (3) above, and then fed back as the current state vector on lines 20.

Data is stored in neural network 10 in the form of the interconnect weights or transmittance values $T_{ij}$. In a model proposed by Hopfield in the article "Neural Networks and Physical Systems with Emergent Collective Computational Abilities", J. P. Hopfield, *Proceedings of the National Academy of Sciences, U.S.A.*, Vol. 79, pp. 2554-2558 (April 1982), the state vector elements $V_i$ assume unipolar binary values (zero or one). The data to be stored in the network is represented by a set of L linearly independent library members $f_k$ of length N, L being less than or equal to N. The T matrix is changed every time the user wants to store a new library member $f_k$ according to the following formula:

$$T_{ij} = \sum_{k=1}^{L} (2f_{ki} - 1)(2f_{kj} - 1) \quad (4)$$

The nonlinear function C in the Hopfield model consists of first applying a clipping function to each element of the state vector, to values of plus one or minus one with zero being the threshold, and then, optionally, clamping the known elements of the state vector to their known values.

In a second model proposed by Marks in the article "A Class of Continuous-level Associative Memory Neural Nets", *Applied Optics*, Volume 26, No. 10, pp. 2005-2010 (May 1987), the state vector values $V_i$ can assume binary bipolar, continuous or multilevel discreet values between minus one and plus one. The library members $f_k$ can be assembled into a library matrix F as follows:

$$F = [f_1; f_2; \cdots ; f_L] \quad (5)$$

It can be shown that the data represented by library members $f_k$ can be stored in a neural net by determining the interconnect matrix T as follows:

$$T = F(F^T F)^{-1} F^T \quad (6)$$

Conceptually, matrix T formed in accordance with Equation (5) projects any point in the N dimensional state space of the neural network onto the L dimensional subspace span by the library members.

Suppose that the desired library member is partially known, i.e., Q of its N elements are known. The nonlinear function C clamps these Q elements to their known values $f_Q$ throughout the recall operation. Thus, the C operator can be expressed as:

$$CA = \begin{bmatrix} f_Q \\ DA_p \end{bmatrix} \quad (7)$$

with A being any vector, and P+Q equaling N. The operator C of Equation (7) forces the first Q elements of A to be equal to the known or specified elements $f_Q$, and performs an arbitrary nonlinear operation D (such as clipping or clamping) on the last P elements of A.

To reduce and simplify the hardware (described below), the problem of iterating a neural network can be reduced in dimensions from N, the total number of nodes, to P, the number of unclamped nodes. Depending on the clamped nodes $V_Q$ and the unclamped nodes $V_P$ in the initial recall state vector, one may partition the matrix T into four blocks. The interconnect weights between unclamped nodes are sorted into matrix $T_{PP}$; interconnect weights between clamped nodes are sorted into $T_{QQ}$; the interconnect weights from clamp nodes to unclamped nodes are sorted into $T_{PQ}$ and those from unclamped nodes to clamped nodes are sorted into $T_{QP}$. By partitioning the interconnect elements in this way, it is only necessary to use two of the smaller matrices, $T_{PP}$ and $T_{PQ}$, with $T_{PQ}$ being used only once. To see this, note that with the elements so sorted, Equation (3) can be rewritten as:

$$\begin{bmatrix} V_Q(m+1) \\ \hline V_P(m+1) \end{bmatrix} = C \begin{bmatrix} T_{QQ} & | & T_{QP} \\ \hline T_{PQ} & | & T_{PP} \end{bmatrix} \begin{bmatrix} V_Q(m) \\ \hline V_P(m) \end{bmatrix} \qquad (8)$$

For the node operator C of Equation 7, $V_Q(m+1)$ is equal to $f_Q$, and need not be calculated. Equation 8 can therefore be rewritten as:

$$V_P(m+1) = D[T_{PQ}V_Q(m) + T_P V_P(m)] \qquad (9)$$

Already the dimension of iteration has been reduced, but the iteration may be further simplified by observing that $T_{PQ}*V_Q$ is a constant vector, since the $T_{ij}$ and $V_Q$ values are fixed. Thus, if we let $K_P = T_{PQ}*V_Q$, Equation (9) becomes:

$$V_P(m+1) = D[T_{PP}V_P(m) + K_P] \qquad (10)$$

The number of computations per iteration has been reduced from $N^2$ to $P^2$, each iteration consisting of a multiplication followed by the addition of a bias constant for each node. As an example, assuming that it is a goal to locate a library member using at least 20% of the input clamped, the reduction eliminates over a third of the multiplications involved at each iteration. The nonlinear clamping of Q nodes has now been replaced by the addition of a bias constant. With the reduced formulation of Equation (11), it is only necessary to have about 60% of the total hardware needed to store and transmit the values of the interconnect matrix. Since matrix T is symmetric, the hardware needed to store these values can be further reduced.

The above analysis assumes that all Q clamped elements of a recall state vector are positioned at one end of the state vector. However, for a practical system, one must be able to deal with the situation in which the clamped elements of the recall state vector are randomly located among the N state vector elements. In this case, a host computer must carry out a sorting operation to reorder the positions of the elements of state vector V, and to arrange the $T_{PP}$ matrix and the $K_P$ vector to contain elements associated with the unclamped elements of the state vector. When the recall has been complete, an unsorting operation recovers the desired library element in its proper order. Such sorting and unsorting operations must be carried out for each recall operation.

Figure 3:
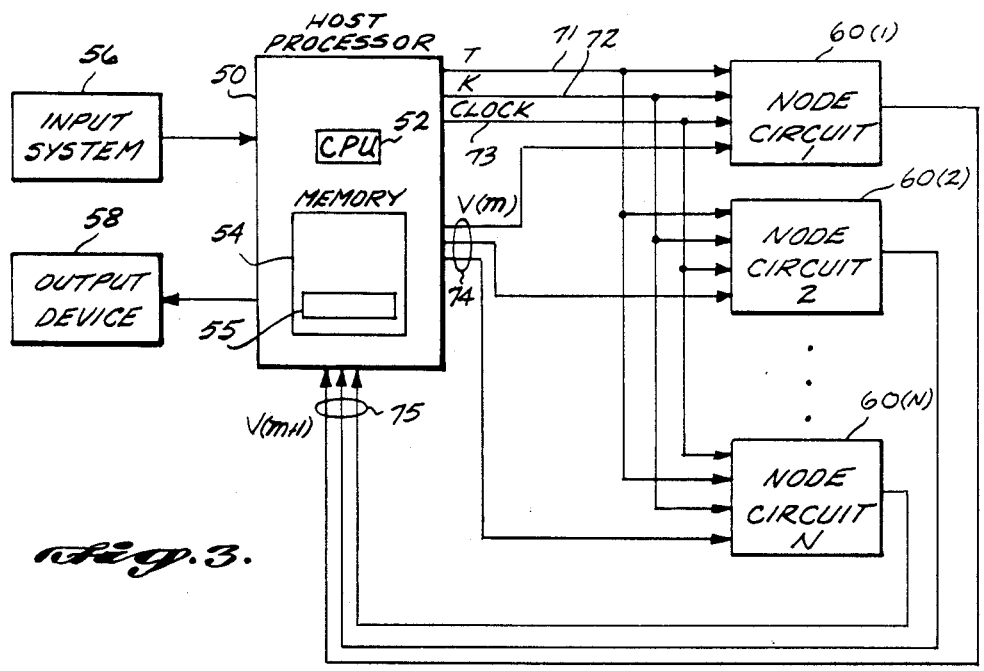
FIG. 3 is a block diagram of an apparatus for modeling a neural network according to the present invention.
Figure 4:
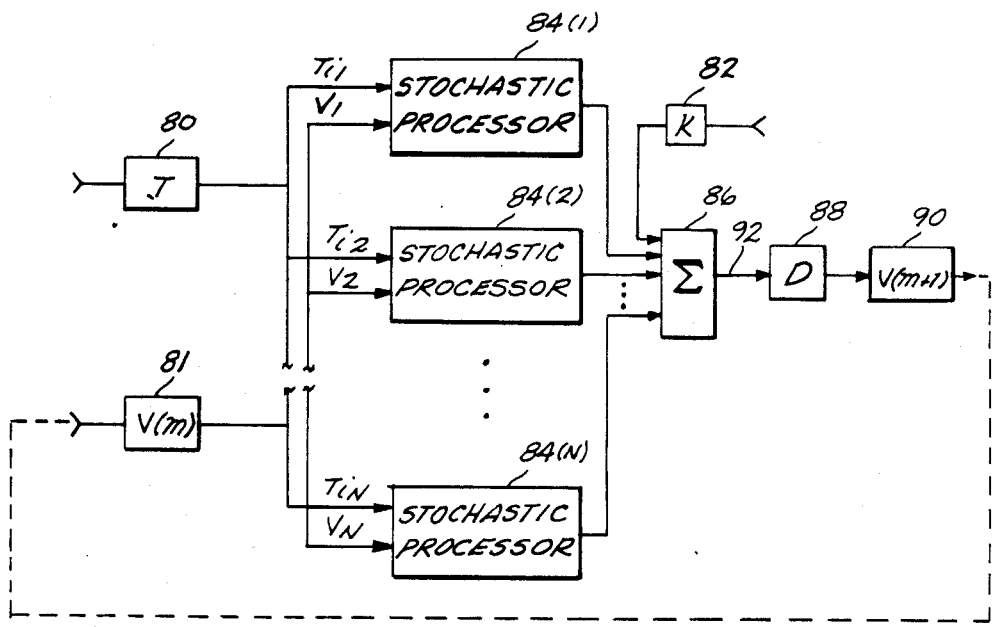
FIG. 4 is a block diagram of a node circuit.

The neural network implementation described below can be used for both the Hopfield model and the Marks model. For the Marks model, to keep the following notation uniform, T will henceforth be used to denote the matrix $T_{PP}$, V will be used to denote the vector $V_P$, K will be used to denote the bias constant vector $K_P$, N will be used to designate the total number of unclamped nodes. With this notation in mind, FIGS. 3 and 4 present a preferred embodiment of a neural network modeling system constructed in accordance with the principles of the present invention. The network comprises host processor 50 and node circuits 60(1) through 60(N). Host processor 50 includes CPU 52 and program/data memory 54 that includes memory area 55 for storing data representing the current state vector. Each node circuit receives data representing interconnect weights T from the host processor via line 71, receives bias constants K from the host processor via line 72, and receives clock signals from the host processor via line 73. In addition, the host processor provides the present value of the state vector V(m) on lines 74 at time cycle m, and receives the updated state vector V(m+1) from the node circuits via lines 75 at time cycle m+1.

During a first phase of operation, host processor 50 receives data representing library members from input system 56, and uses such data to compute interconnect matrix T and bias constants K, and transmits such data to each node. During a second phase of operation, the host computer receives an input vector through the input system, the input vector comprising a noisy or incomplete state vector or library member. CPU 52, under the control of a suitable program that may be stored in memory 54, then commences an iteration in which the current state vector in memory area 55 is transmitted to the node circuits via lines 74, and updated state vector is received via lines 75, and the updated state vector is then stored as the current state vector in memory area 55. The iteration is commenced by setting the current state vector equal to the input vector, and is terminated when the values of the current state vector elements coverge, at which time the state vector in memory area 55 will represent the library member that is most similar to the input vector. This library member is then output via output device 58. In FIG. 3, it should be understood that lines 71-75 are provided to illustrate data and signal flow, and would not typically correspond to actual conductor lines in a typical device. For example, data representing the transmission elements, bias constants, and state vector values could be exchanged between the host computer and nodes via a common bus.

FIG. 4 represents a preferred embodiment of an individual node circuit 60. The node circuit comprises memories 80-82, stochastic processors 84(1)-84(N), adder 86, node operator circuit 88, and memory 90. Memories 80-82 receive and store the interconnect weights $T_{ij}$, the current state vector $V_j(m)$, and bus constant K, respectively. Appropriate combinations of the $T_{ij}$ and $V_j$ elements are then multiplied by stochastic processors 84, an arrangement that permits the N multiplications required for each updated state vector element $V_i(m+1)$ to be performed in a single parallel processing step. Adder 86 combines the output signals from the stochastic processors with one another and with bias constant K, to produce an output signal on line 92. This signal may then be subjected in node operator circuit 88 to a nonlinear operation, such as hard thresholding, single or multilevel clipping, etc., to produce a final output signal representing V(m+1) that is stored in memory 90, to be transmitted to the host processor. The present invention could be implemented using a single stochastic processor, or fewer than N stochastic processors, for each node circuit. However, the hardware simplicity of each stochastic processor, as described below, makes the use of N parallel stochastic processors practical, thereby providing a significant processing speed advantage.

Stochastic processing is an alternative to conventional digital or analog processing for performing primitive data processing operations such as multiplication. A survey of stochastic processing is provided in "Stochastic Computing Systems", B. R. Gaines, *Advances in Information System Sciences*, J. Tou, Editor, Vol. 2, pp. 37-170, Plenum Press (1969). In a stochastic processing system, each operand is represened by a binary value sequence*, i.e., a sequence of ones and zeros. Conversion of an operand into stochastic form can be performed by first scaling the operand such that it lies in the range between zero and one, and by then converting the operand into a sequence of binary values (ones and zeros) such that in a given sequence of sufficient length, the ratio of the number of one values in the sequence to the total number of values in the sequence is equal to the scaled operand.

The conversion of an operand into its stochastic representation is carried out by comparing the operand to a sequence of random numbers that also lie in the range between zero and one. Whenever the operand exceeds the random number, a one value is inserted into the output sequence. When the operand is less than the random number, a zero value is inserted into the output sequence. An important advantage of stochastic processiing, of particular importance in the present invention, is that primitive data processing operations such as multiplication can be performed with extremely simple hardware, e.g., a single logic gate.

Figure 5:
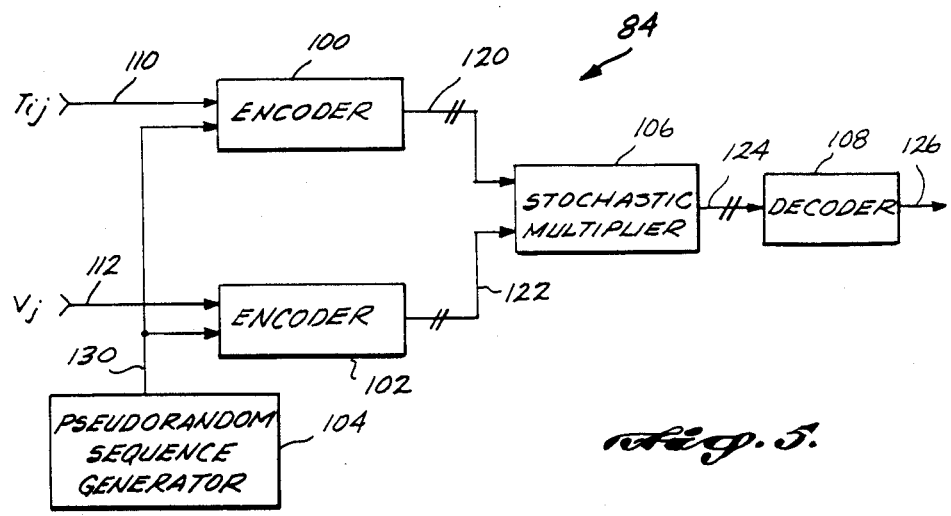
FIG. 5 is a block diagram of a stochastic processor.

Referring now to FIG. 5, in one preferred embodiment, each stochastic processor 84 comprises encoders 100 and 102, pseudorandom sequence generator 104, stochastic multiplier 106, and decoder 108. Encoders 100 and 102 convert the $T_{ij}$ and $V_j$ values on lines 110 and 112, respectively, into their respective stochastic representations on lines 120 and 122, respectively. In FIG. 5 and in subsequent figures, lines carrying stochastic signals are designated by two angled parallel lines. Stochastic multiplier 106 multiplies the stochastic signals on line 120 and 122 together, to produce a stochastic product signal on line 124. The stochastic product signals on line 124 is converted to its nonstochastic representation by decoder 108, and output by the decoder on line 126. The signal on line 126 forms one of the inputs to adder 86 (FIG. 4).

In a preferred stochastic processing system, pseudorandom rather than truly random numbers are used to encode the operands, and both operands are encoded using the identical pseudorandom number sequence, such that the resulting stochastic representations are "in phase". In the system shown in FIG. 5, pseudorandom sequence generator 104 generates a signal on line 130 representing the pseudorandom number sequence, and the signal on line 130 is used by both encoder 100 to encode the transmission coefficients $T_{ij}$, and by encoder 102 to encode the corresponding current state vector element $V_j$.

The circuits shown in FIGS. 4 and 5 may operate in accordance with a microclock signal and an iteration clock signal provided by the host computer via line 73 (FIG. 3). During each sequence of the microclock signal, each of encoder 100 and 102 produces a single bit on lines 120 and 122, respectively, stochastic multiplier 106 inputs these bit and outputs a bit on line 124, etc. Each iteration clock period contains R microclock cycles, R being the bit length (number of bits) of each stochastic representation. During a single period of the iteration clock signal, each stochastic processor multiplies an interconnect weight $T_{ij}$ times a state vector element $V_j$, and thus the set of N stochastic processors 84(1)-84(N) multiplies the current state vector by one row of the interconnect matrix T. Suitable values for the representation R will vary depending on the application and neural net model used, as discussed in greater detail below.

Figure 6:
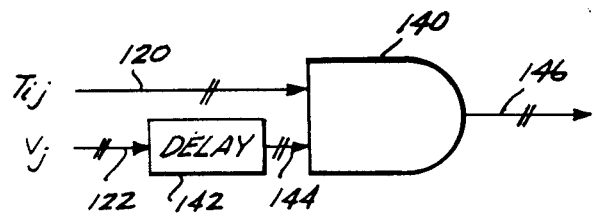
FIG. 6 is a circuit diagram of a stochastic multiplier.

A preferred implementation of stochastic multiplier 106 is shown in FIG. 6 The multiplier comprises AND gate 140 and delay circuit (e.g., shift register) 142. The stochastic input signal on line 120 (representing $T_{ij}$) forms one of the inputs to AND gate 140. The second stochastic input signal on line 122 (representing $V_j$) is input to delay circuit 142, and a delayed version of the signal on line 122 forms the other AND gate input on line 144. The input connections could of course be reversed, with the stochastic $T_{ij}$ signal being provided on line 122 and the stochastic $V_j$ signal being provided on line 120. The output of AND gate 140 on line 146 is the stochastic representation of the product $T_{ij} \cdot V_j$. Suitable delays are discussed below. For example, in a system where the length of each stochastic representation is 1023 bits, a suitable delay value is 28 bits.

Referring back to FIG. 3, it would be possible to use a single pseudorandom sequence generator for all of the node circuits. However to reduce signal routing in a large system, it may be preferable to include a separate pseudorandom sequence generator in each node circuit.

Figure 7:
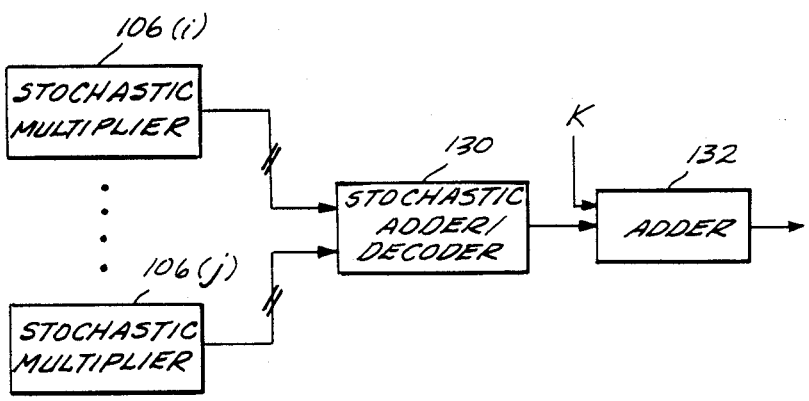
FIG. 7 is a block diagram of a second embodiment of a stochastic processor.

FIG. 7 shows a second preferred embodiment in which the outputs from stochastic multipliers 106 for the N stochastic processors are summed and converted to a nonstochastic representation by stochastic adder/decoder 130. Adder 132 then combines the output of stochastic adder/decoder 130 with bias constant K. Alternatively, K could be converted to stochastic form, and input to stochastic adder/decoder 130. Various embodiments for stochastic adder 130 are described below.

Figure 8:
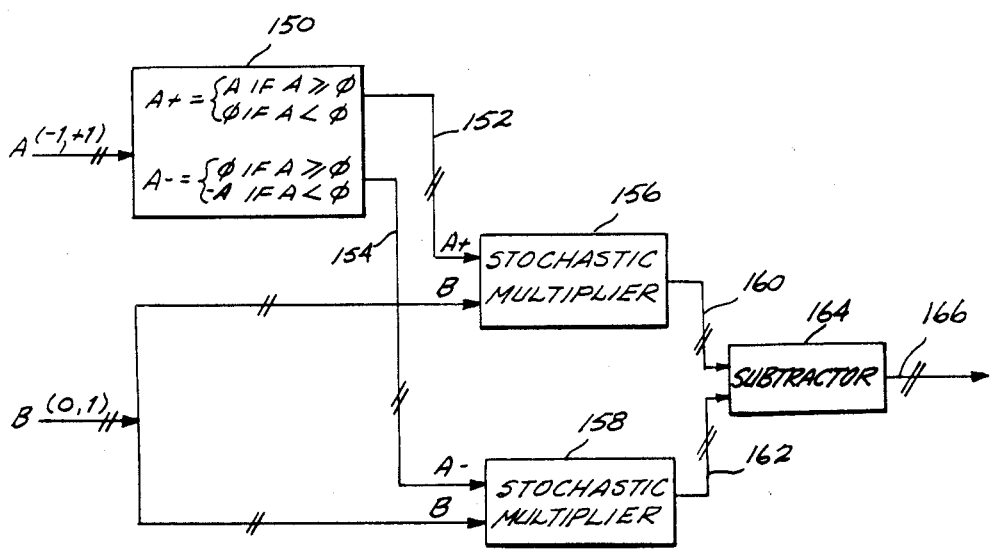
FIG. 8 is a block diagram of a stochastic processor for one bipolar operand.

FIG. 8 illustrates implementation of a stochastic processor for the case in which one the operands ($T_{ij}$ or $V_j$) is bipolar, i.e., can take on a value between $-1$ and $+1$. The bipolar operand A is input (in stochastic form) to signal transformer 150 that produces output signals A+ and A− on lines 152 and 154 respectively. The A+ signal on line 152 is equal to A if A is greater than or equal to 0, and is otherwise equal to 0. The A− signal on line 154 is equal to 0 if A is greater than or equal to 0, and is equal to −A if A is less than 0. Stochastic multiplier 156 multiplies the A+ signal by the B signal to produce a first product signal on line 160. Similarly, stochastic multiplier 158 multiples the A− signal by the B signal, to produce a second product signal on line 162. Subtractor 164 then subtracts the signal on line 162 from the signal on line 160, to produce the appropriate output signal on line 166.

Figure 9:
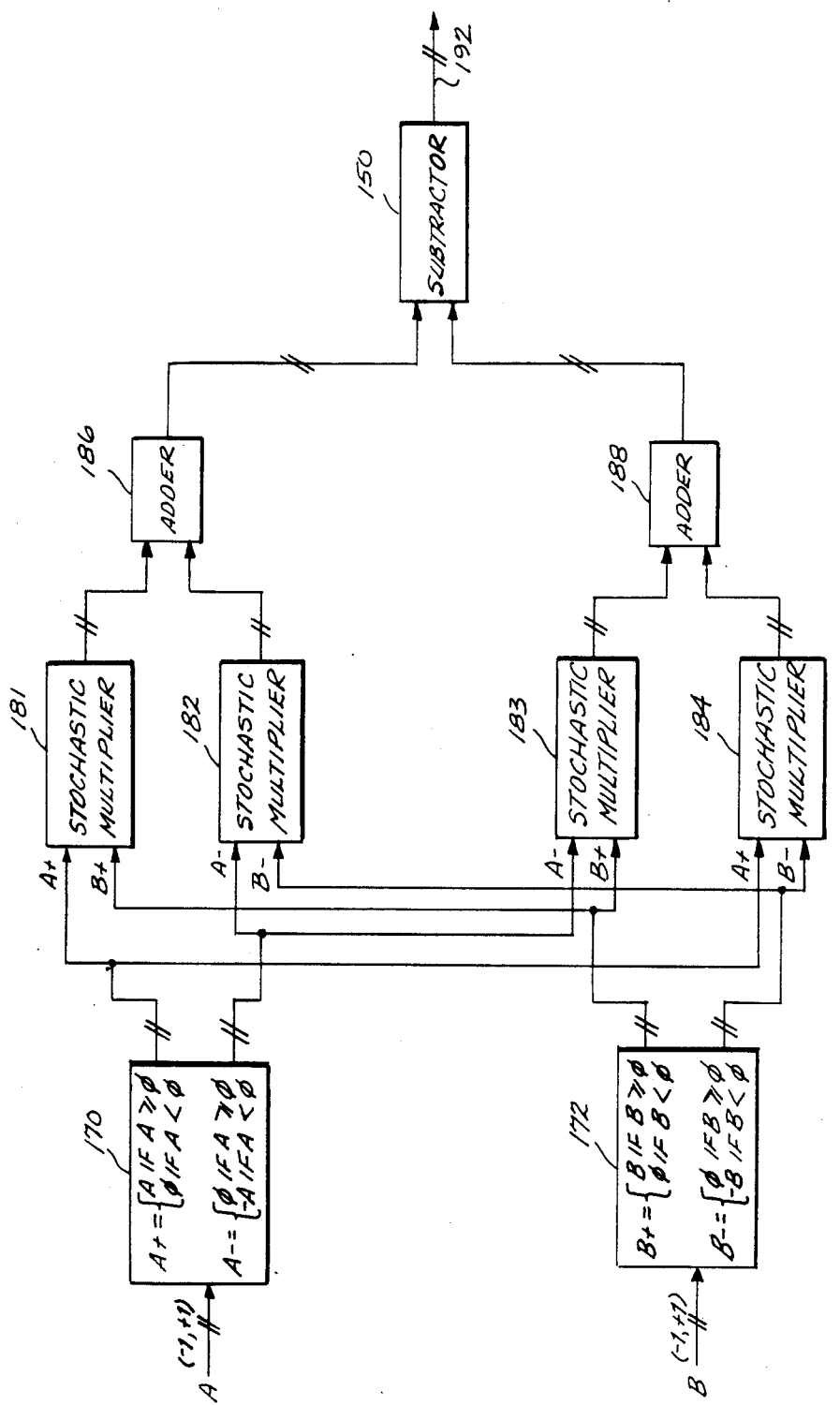
FIG. 9 is a block diagram of a stochastic processor for two bipolar operands.

FIG. 9 illustrates the implementation of a stochastic processing ciricuit for the case in which both operands A and B are bipolar. Signal transformer 170 transforms stochastic input signal A into A+ and A− signals, as described for the FIG. 8 embodiment. Similarly, signal transformer 172 transforms stochastic input signal B into B+ and B− signals. Stochastic multipliers 181-184 then form all possible products of one A and one B signal. Adder 186 adds the positive product terms to one another, i.e., adder 186 combines the terms A+ B+ with A−B−. Similarly, adder 188 adds the negative terms, A+B− and A−B+ to one another. Substrator 190 then forms the output signal by subtracting the negative product terms from the positive product terms, to produce an output signal on line 192.

For some embodiments, it may be desirable to scale the $T_{ij}$ values upward by a predetermined factor, to improve the accuracy of the multiplication operations. In such an embodiment, the circuits illustrated in FIGS. 8 and 9 would utilize a downward scaling factor equal to the reciprocal of the upward scaling factor.

The nature of stochastic processing is such that the larger the number R of microclock periods in one iteration cycle, the more accurate will be the stochastic multiplication. There is therefore a tradeoff between the computational time and the quality of the results, i.e., the distance from the desired library element. This total computational time is (P·I·R), where P is the microlock period, R is the number of microclock periods in each iteration cycle, and I is the number of iterations required for convergence. I depends upon the problem parameters including the network size, the Hamming distance of the initial partial input, and the number of library elements.

The accuracy of stochastic representation and of stochastic multiplication, as a function of the number of microclock periods per iteration cycle, is as follows:

| R | DELAY | AVERAGE ERROR | MAXIMUM ERROR |
|---|---|---|---|
| 511 | 6 | 0.00142 | 0.00631 |
| 1023 | 28 | 0.00084 | 0.00365 |
| 2047 | 27 | 0.00047 | 0.00203 |

Because of the fact that the original Hopfield neural net model contains a nonlinearity in the feedback path, i.e., clipping to +1 or −1, it has been shown that it can be very tolerant to inexact computations before convergence. For this class of neural nets, there is no need for high resolution in stochastic processing. In contrast, in the case of the neural network model proposed by Marks, there is no nonlinearity in the feedback path. However, the addition of the bias constant K for each node is a nonlinear operation. As a result, this class of neural networks may require high resolution in stochastic processing to converge close to the desired library members. Here the term "close" means an acceptably small Euclidean error distance, which may vary depending upon the particular case. For example, the Marks model used for bipolar values requires less accuracy than in the Marks model with the state vector elements assuming multilevel values between−1 and +1 at 0.1 increments.

Results of computer simulation show that even with stochastic processing using 1023 microclocks per iteration cycle, convergence to desired library members to within 0.1 in Euclidean error distance can be easily achieved for network sizes up to 1000 nodes. Thus in the case where such convergence is acceptable, stochastic processing helps reduce the hardware complexity of implementation of the neural network, and yet still meets the resolution requirements for relatively large Hopfield neural networks for associative memories.

The neural network of the present invention can function in either synchronous or asynchronous mode. In synchronous mode, each mode will synchronize its updating operations based on an iteration cycle signal provided by the host computer. For synchronous mode, additional hardware is required in each stochastic processor to count the number of microclock cycles received, and determined when to stop one iteration cycle and start a new one based upon the locally available counter, regardless of what is happening at the other nodes. To simplify the design, time may be used as the convergence criteria, i.e., a predetermined time is used as the instant after the start of each recall operation that the host computer should access the $V_i$ values as a result of the recall operation.

Figure 10:
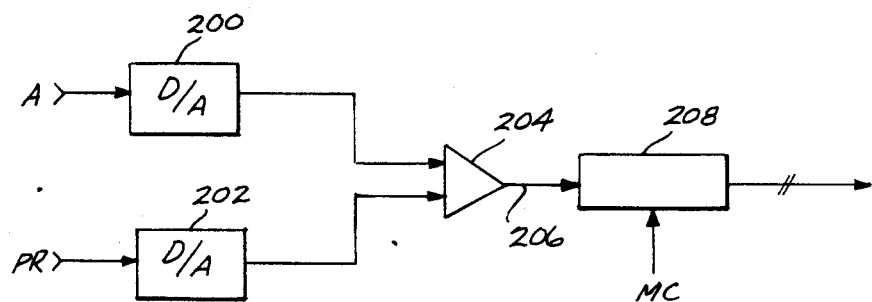
FIG. 10 is a block diagram of an encoder for a stochastic processor.

If very high resolution is not required, then each encoder may be implemented in analog form. In such an implementation, shown, in FIG. 10, digital signals representing operand A and pseudorandom number PR are converted into analog form by digital-to-analog converters 200 and 202, with the resulting analog signals being compared by analog comparator 204. Each microclock cycle (MC), the output of analog comparator 204, on line 206, is converted into a binary value and stored in register 208. The output of register 208 comprises the signal A encoded in stochastic form. However, if higher accuracy is required, then it may be necessary to go to a digital circuit in which a digital comparator directly compares the A signal to the PR signal, to produce a series of 1 and 0 bits indicating the results of the comparisons.

In an all electronic implementation, the AND gates that makes up the stochastic multipliers can be manufactured into a VLSI array, with signal routing included. The only practical limitation is the number of input and output pins. For an electro-optical implementation of the neural net of the present invention, the required AND gates can be built out of appropriate optical devices, such as an array of Fabry-Perot interferometers. See, for example, E. Abraham et al., "The Optical Computer," *Scientific American*, pp. 85–93 (Feb. 1983). Optical implementation has the advantage of being able to route signals through space, without requiring space on the chip. Such free-space routing techniques using optical technology have been discussed in J. W. Goodman, "Optical Interconnections for VSLI Systems," *Proceedings of the IEEE*, Vol. 72, No. 7, pp. 850–866 (Jul. 1984).

FIGS. 11a–11d illustrate four techniques for implementing stochastic adder/decoder 130 shown in FIG. 7. In the embodiment shown in FIG. 11a, the stochastic input signals from the stochastic multipliers are input to an array 220 of analog adders 222 connected in a binary tree-like arrangement, to produce an analog sum signal on line 224. The analog sum signal is input to integrator 226, schematically shown as comprising amplifier 228, capacitor 230, and switch 234 that initializes the integrator in response to an update clock signal (UC) on line 236. Array 220 is cleared each microclock cycle by a microclock signal (MC) on line 232. The sum signal on line 224 represents the sum of the stochastic input signals in stochastic form. Integrator 226 integrates the sum signal over an iteration cycle, such that the output signal of the integrator on line 238 is an analog signal representing the sum conventional analog form.

Figure 11A:
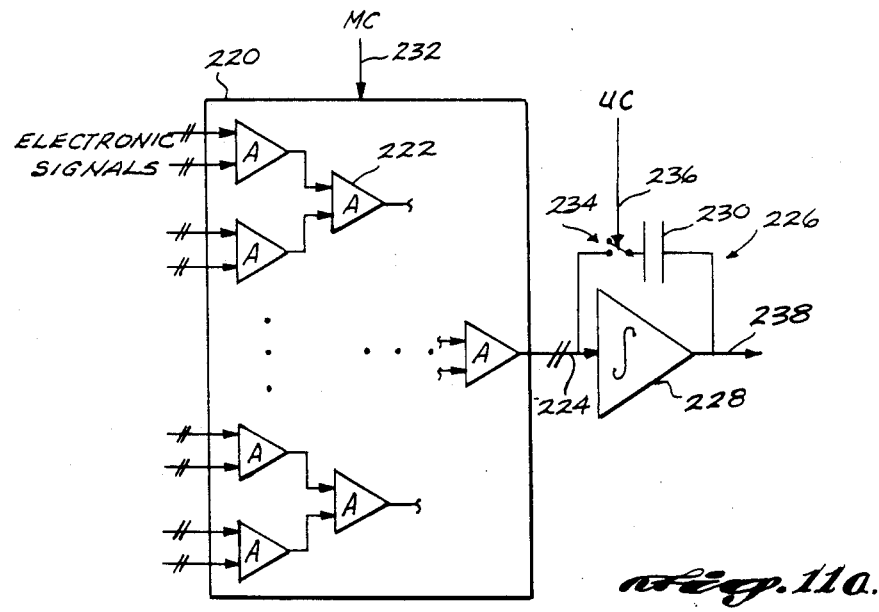
FIGS. 11a–11d show four embodiments of a stochastic adder/decoder.
Figure 11B:
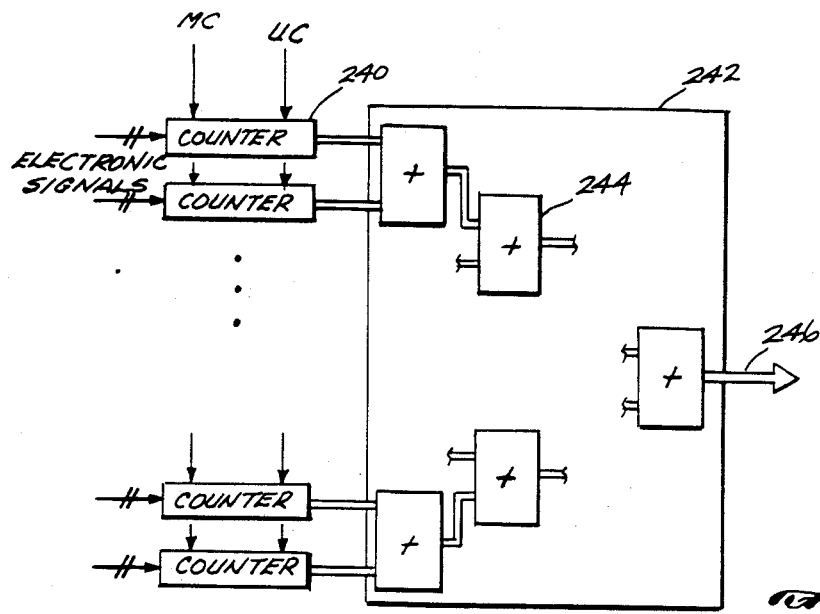

FIG. 11b shows a higher resolution implementation of the stochastic adder-decoder. In this implementation, the stochastic product signals are input to a bank of counters 240, each counter being clocked by the microclock signal (MC) and cleared by the update clock signal (UC). The counter outputs are input to an array 242 of digital adders connected in a binary tree-like arrangement similar to that of FIG 11a, to produce a digital, nonstochastic representation of the sum on output line 246.

Figure 11C:
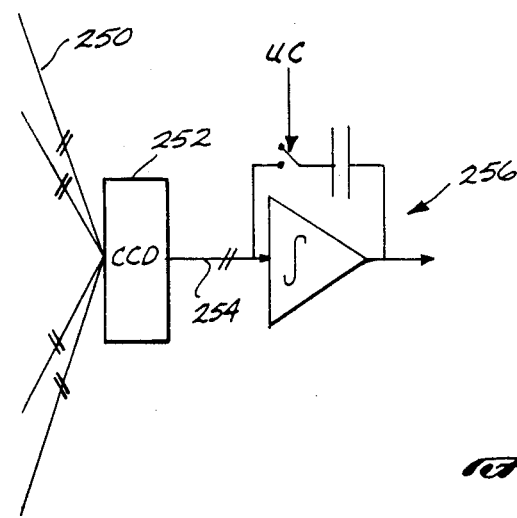

FIG. 11c shows a relatively low resolution optical implementation of the stochastic adder/decoder. In this arrangement, the stochastic product signals 250, in the form of optical signals, are input to a CCD cell 252, where they produce a quantity of electrical charge corresponding to the sum of the optical signal strengths. The output of CCd cell 252 on line 254 is then integrated by integrator 256 as in FIG. 11a, with the integrator being cleared each iteration cycle by the update clock signal.

Figure 11D:
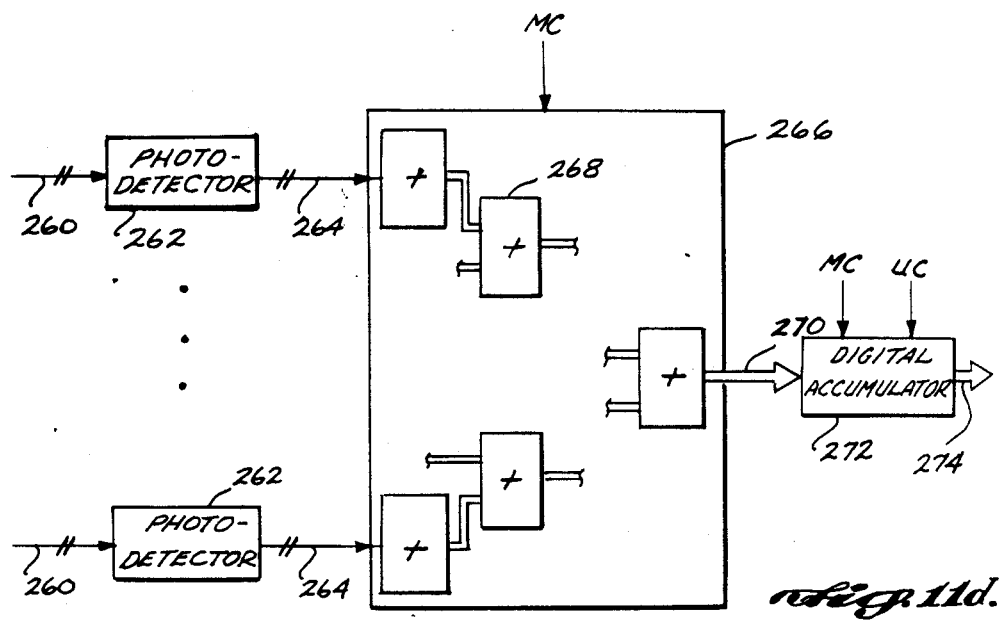

FIG. 11d shows a relatively high resolution optical embodiment. In this arrangement, each optical input signal 260 is input to a separate photodetector 262, each photodetector converting the optical signal into a corresponding stochastic electric signal on line 264. The electrical signals on lines 264 are then input to an array 266 of digital adders 268, as in FIG. 11b, the digital adders being clocked by the microclock signal (MC). The digital adders produce a digital, nonstochastic representation on output lines 270 that may be accumulated by digital accumulator 272 each microclock cycle, to produce a total sum on lines 274 at the end of each update clock cycle.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. An apparatus for implementing a neural network having N nodes coupled to one another by interconnections having interconnect weights $T_{ij}$ that quantify the influence of node j on node i, the apparatus comprising:
   a plurality of node circuits, one associated with each node;
   data processing means including means for receiving library data representing one or more library members, means for determining interconnect weights $T_{ij}$ from the library data and for transmitting interconnect weight data representing the interconnect weights to each node circuit, means for storing current state vector data representing a current state vector comprising N state vector elements, means for receiving input data representing a library member to be retrieved, means for performing one or more iterations until the current state vector reaches an equilibrium state, each iteration comprising transmitting the current state vector data to the node circuits, receiving updated state vector data representing an updated state vector from the node circuits, and setting the current state vector data equal to the updated state vector data, and means for initializing the iteration by setting the current state vector data equal to the input data; and
   each node circuit comprising means for receiving the interconnect weight and current state vector data, and one or more stochastic processors operating in parallel, each stochastic processor including means for multiplying data representing one interconnect weight by data representing a corresponding state vector element to produce a product signal, means for summing the product signals to thereby determine the updated state vector data, and means for transmitting the updated state vector data to the data processing means.

2. The apparatus of claim 1, wherein each stochastic processor includes means for generating a pseudorandom sequence of numbers, means for using said pseudorandom sequence to encode data representing an interconnect weight and data representing a state vector element into first and second stochastic input signals respectively, and a stochastic multiplier for receiving the stochastic input signals and producing a stochastic output signal representing the product of the interconnect weight and the state vector element.

3. The apparatus of claim 2, wherein each stochastic multiplier comprises delay means for delaying the first stochastic input signal to produce a delayed first stochastic input signal, and an AND gate for performing a logical AND operation on the delayed first stochastic input signal and the second stochastic input signal to produce the stochastic output signal.

4. The apparatus of claim 1, wherein the data processing means includes means for determining bias data for each node from the interconnect weight data and the input data, and means for transmitting the bias data to the respective node circuits, and wherein each node circuit comprises means for summing the product signals and the bias data to thereby determine the updated state vector data.

5. The apparatus of claim 1, wherein each node circuit comprises N stochastic processors, each stochastic processor including means for multiplying data representing a predetermined state vector element by data representing a corresponding interconnect weight, each node circuit comprises means for causing the stochastic processors to operate such that N product signals are produced in parallel.

6. The apparatus of claim 5, wherein each stochastic processor includes means for generating a pseudorandom sequence of numbers, means for using said pseudorandom sequence to encode data representing an interconnect weight and data representing a state vector element into first and second stochastic input signals respectively, and a stochastic multiplier for receiving the stochastic input signals and producing a stochastic output signal representing the product of the interconnect weight and the state vector element.

7. The apparatus of claim 6, wherein each stochastic multiplier comprises delay means for delaying the first stochastic input signal to produce a delayed first stochastic input signal, and an AND gate for performing a logical AND operation on the delayed first stochastic input signal and the second stochastic input signal to produce the stochastic output signal.

8. The apparatus of claim 5, wherein the stochastic processors produce the respective product signals in stochastic form, and wherein the the means for summing the product signals includes an array of analog adders connected to the stochastic processors for summing the stochastic product signals to produce a stochastic summation signal, and means for integrating the stochastic summation signal to produce the updated state vector data.

9. The apparatus of claim 5, wherein the stochastic processors produce the respective product signals in stochastic form, and wherein the means for summing the product signals comprises counting means for counting each stochastic product signal to produce a corresponding nonstochastic digital count signal, and an array of digital adders for adding the digital count signals to produce the updated state vector data.

10. The apparatus of claim 5, wherein the stochastic processors produce the product signals in optical form, and wherein the means for summing the product signals comprises a CCD element for receiving and summing the optical product signals to produce an electronic summation signal, and means for integrating the electronic summation signal to produce the updated state vector data.

11. The apparatus of claim 5, wherein the stochastic processors produce the respective product signals in optical form, and wherein the means for summing the product signals comprises a photodetector for receiving each product signal and producing a corresponding electrical signal, and digital adder means for adding the electrical signals to produce the update state vector data.

12. The apparatus of claim 1, wherein either the interconnect weight or the state vector elements comprise bipolar operands and the other of the interconnecting weights or state vector elements not comprising bipolar operands comprises unipolar operands, wherein each stochastic processor includes conversion means, first and second stochastic multiplies connected to the conversion means, and a subtractor coupled to the stochastic multipliers, the conversion means for converting the bipolar operand into a positive signal and a negative signal, the positive signal being equal to the bipolar operand if the bipolar operand is greater than zero and otherwise being equal to zero, the negative signal being equal to the absolute value of the bipolar operand if the bipolar operand is less than zero and equal to zero otherwise, the first stochastic multiplier including means for multiplying the positive signal by the unipolar operand to produce a first intermediate signal, the second stochastic multiplier including means for multiplying the negative operand by the unipolar operand to produce a second intermediate signal, and the subcontractor including means for subcontracting the second intermediate signal from the first intermediate signal to produce the product signal.

13. A method for implementing a neutral network having N nodes coupled to one another by interconnections having interconnect weights $T_{ij}$ that quantify the influence of node j on node i, the method comprising:
providing data processing means and a plurality of node circuits, one node circuit for each node;
at the data processing means, receiving library data representing one or more library members, determining interconnect weights $T_{ij}$ from the library data and transmitting interconnect weight data representing the interconnect weights to each node circuit; storing current state vector data representing a current state vector comprising N state vector elements, receiving input data representing a library member to be retrieved, performing one or more iterations until the current state vector reaches an equilibrium state, each iteration comprising transmitting the current state vector data to node circuits, receiving updated state vector data representing an updated state vector from the node circuits, setting the current state vector data equal to the updated state vector data, and initializing the iteration by setting the current state vector data equal to the input data; and
at each node circuit, receiving the interconnect weight and current state vector data, stochastically multiplying in parallel the interconnect weight data and the state vector data to produce product signals, summing the product signals to thereby determine the updated state vector data, and transmitting the updated state vector data to the data processing means.

* * * * *